United States Patent [19]

Förster et al.

[11] Patent Number: 5,080,215

[45] Date of Patent: Jan. 14, 1992

[54] TORSION VIBRATION DAMPER

[75] Inventors: Andreas Förster, Schweinfurt; Bernhard Schierling, Kürnach, both of Fed. Rep. of Germany

[73] Assignee: Fichtel & Sachs AG, Schweinfurt, Fed. Rep. of Germany

[21] Appl. No.: 599,669

[22] Filed: Oct. 18, 1990

[30] Foreign Application Priority Data

Oct. 19, 1989 [DE] Fed. Rep. of Germany ....... 3934798

[51] Int. Cl.$^5$ .............................................. F16D 47/06
[52] U.S. Cl. .................................. 192/106.2; 267/167
[58] Field of Search ................. 192/106.2; 464/64, 68; 267/166, 167, 286

[56] References Cited

U.S. PATENT DOCUMENTS

| | | | |
|---|---|---|---|
| 2,587,810 | 3/1952 | Beyer | 267/167 |
| 2,797,937 | 7/1957 | Frishof | 267/167 |
| 3,468,527 | 9/1969 | Mather | 267/167 |
| 4,347,717 | 9/1982 | Lamarche | 192/106.2 |
| 4,422,535 | 12/1983 | Ling | 192/106.2 |
| 4,451,244 | 5/1984 | Lamarche | 192/106.2 |
| 4,637,500 | 1/1987 | Göbel | 192/106.2 |
| 4,716,998 | 1/1988 | Tsukamoto et al. | 192/106.2 |
| 4,857,032 | 8/1989 | Aiki et al. | 192/106.2 |
| 4,987,980 | 1/1991 | Fujimoto | 192/106.2 |

FOREIGN PATENT DOCUMENTS

| | | |
|---|---|---|
| 0136825 | 4/1985 | European Pat. Off. . |
| 3723015 | 1/1989 | Fed. Rep. of Germany . |
| 3831009 | 3/1989 | Fed. Rep. of Germany ... 192/106.2 |
| 2620503 | 3/1989 | France ............................ 192/106.2 |
| 2193290 | 2/1988 | United Kingdom . |
| 2193789 | 2/1988 | United Kingdom . |
| 2194020 | 2/1988 | United Kingdom . |
| 2194021 | 2/1988 | United Kingdom . |
| 2206950 | 1/1989 | United Kingdom . |

Primary Examiner—Leslie A. Braun
Assistant Examiner—Nicholas Whitelaw
Attorney, Agent, or Firm—Toren, McGeady & Associates

[57] ABSTRACT

The invention relates to torsion vibration dampers in the power transmission path of a motor vehicle with an internal combustion engine, the coil thrust springs used being particularly in the case of a considerable length in proportion to their diameter, already precurved prior to fitment into their final position. This facilitates fitment and makes it possible to influence the development of friction force as the rotary speed increases.

20 Claims, 9 Drawing Sheets

TORSION VIBRATION DAMPER

BACKGROUND OF THE INVENTION

The invention relates to a torsion vibration damper in the power transmission path of a motor vehicle.

From DE-A-3 723 015 a damper is known comprising input parts adapted to be driven by an internal combustion engine, output parts which are connected to a gear mechanism and a first torsion spring arrangement between both parts comprising coil springs having a high length:diameter ratio and being axially and radially guided in guide passages disposed concentrically of the axis of rotation and which are compressed upon the transmission of torque between the input and output parts. The coil springs having a high length:diameter ratio are incorporated into guide passages which are provided in a radially outward direction with a wear-resistant lining. Between this lining and the coils of the coil springs a centrifugal force-dependent friction is generated. This centrifugal force-dependent friction is superposed on other friction force components which result, for example, from the initial tension with which the springs are inserted into their curved guide passages. Furthermore, with increasing compression of the coil springs, radially directed friction force components are created which are dependent upon transmitted torque and angle of the applied surfaces between the two ends of the springs.

It is an object of the present invention to provide a torsion vibration damper having a spring arrangement which permits of easier handling upon assembly of the individual parts of the torsion vibration damper and which furthermore admits of influencing of the friction created by centrifugal force in order to arrive at better tuning.

SUMMARY OF THE INVENTION

According to the invention, the coil thrust springs are precurved over this longitudinal extension prior to their installation. By producing the coil thrust springs in a precurved form, there is on the one hand easier assembly when assembling the torsion vibration damper since these springs can be inserted into their guides without the application of force. Furthermore, by such a measure, the external friction is reduced considerably, at least in the low speed range, by the absence of any radial clamping.

The use of precurved coil thrust springs is advantageously envisaged in the parts of a torsion vibration damper which work with the lowest spring rating.

The degree of precurvature can thereby vary according to the desired effect. In the case of a curvature which corresponds exactly to what will subsequently be the incorporated state, there is in addition to the ease of assembly a slight external friction at least in the low and medium speed range, since the radial clamping effect which cannot be avoided in the state of the art is absent. If there is a more pronounced curvature in respect of what will subsequently be the installed state, the peripheral end portions of the springs work in a friction-free manner in the lower and medium speed ranges and only the middle part of the springs is always held in a frictionally applied state. If the curvature is designed to be less than what will subsequently be the incorporated state, then in addition to the easier fitment, the end zones of the springs will be applied in the lower speed range and in addition all the turns of the spring will be applied at higher speed and, with increasing force component, upon the transmission of torque.

It is furthermore envisaged that the spring ends of the precurved coil thrust springs be so held in a radial direction by holders that in the end zones there is no contact with the radially outer guide parts. This arrangement of the springs ensures on the one hand that the end faces of the springs which are relatively sharply edged due to the production process are not incorporated into the sliding friction process so that, despite inexpensive spring manufacture, there is no excessive wear and tear. In addition, this measure in conjunction with the previously described measures of providing the curvature results in a very wide range of variations in the adaption of a torsion vibration damper to whatever type of motor vehicle is involved.

For example, torsion vibration dampers of the above-mentioned type are used in bridging coupling of hydrodynamic power transmission systems. However, it is also readily possible to use such torsion vibration dampers in clutch discs of friction clutches or to incorporate them between the two rotating masses of a two-mass flywheel. When used in a bridging coupling, the piston is expediently of pot-shaped construction so that in this region the curved coil springs are positively guided at least in a radial direction and additionally also in an axial direction. Thus, the piston fulfils a dual function.

Various features of novelty which characterize the invention are pointed out with particularity in the claims annexed to and forming part of this disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWINGS

FIGS. 2a and 2b are sectional views of a coupling viewed on the lines IIA—IIA or IIB—IIB in FIG. 1 resp.;

FIGS. 1 and 2 show a bridging coupling 1 within a hydrodynamic torque converter disposed between an internal combustion engine (not shown) and a gear mechanism (likewise not shown) of a motor vehicle. Of the torque converter, though, only the turbine wheel 9 is shown which is required to explain the present instance. The drive to the bridging coupling 1 passes through a housing 12 which is rotationally rigidly connected to the crankshaft of an internal combustion engine. The housing 12 encloses both the bridging coupling and also the complete torque converter. When the torque converter is bridged, the bridging coupling must so damp the torsion vibrations emanating from the internal combustion engine that they are no longer perceptible by the occupants of the vehicle. For this purpose, there is disposed between the housing 12 and the output part of the torque converter, in this case a hub 10 of the turbine wheel 9, a torsion vibration damper 2 having two radially superposed torsion spring arrangements 13, 14 and also friction means. In the present case, both torsion spring arrangements 13 and 14 are connected in series. All component parts rotate during operation about an axis of rotation 17. The torsion vibration damper 2 is integrated into a control piston 8 which, in order to bridge the torque converter, is brought into engagement with the housing 12 under the control of the hydraulic pressure in the torque converter. For this purpose, there is between the two parts 8 and 12 a friction surface 21. The piston 8 is of substantially pot-shaped form and has a radially extending wall zone 19 which merges into an axially extending wall zone 20. In the transition zone, the piston 8 forms substantially a quarter of a circle and in this zone it guides coil thrust springs 15 of the first torsion spring arrangement 13 in a radial direction and in the axial direction. In the other axial direction, the coil thrust springs 15 are guided by a guide element 22 which is connected to the piston 8 radially outside the springs via rivets 62 and it comprises apertures of which the peripherally spaced apart control edges 26 apply torque to the spring ends. With an eye to an even application of torque to the spring ends, there are on the inside face of the piston 8 and opposite the guide element 22, operating elements 27 which have corresponding control edges 31. They are connected to the piston 8, for example by means of rivets 63. In the axial intermediate space between the guide elements 22 and the control elements 27 extends a hub disc 46 which is provided with corresponding recesses for the springs 15, passing on the torque. The hub disc 46 extends radially inwardly into the torsion spring arrangement 14 where it transmits the torque to the coil thrust springs 16. The coil thrust springs 16 are, on both sides of the hub disc 46, inserted into windows of cover plates 47, 48 which are rotationally rigidly connected to one another, dissipating the torque from the torsion vibration damper 2 and in fact via clinch bolts 60 into a hub 10 of the turbine wheel 9. The clinch bolts are extended in the direction of the cover plate 48 where they engage corresponding recesses 61 in rotationally rigid fashion. The connection 60-61 is axially loose, since the complete torsion vibration damper 2 together with the piston 8 undergoes an axial displacement during its retraction and/or extension movement. In its radially inner portion, the piston 8 has, facing the direction of the turbine wheel 9, a shoulder by which it is fitted onto the outside diameter of the hub 10 being sealed there by means of a gasket 71. FIG. 1 also shows that between the hub 10 and the housing 12 there is a thrust ring 11 which transmits the axial thrust from the turbine wheel 9 to the housing 12. FIG. 2a with the partial view IIA—IIA or FIG. 2b with partial view IIB—IIB shows how the coil thrust springs 15, 16 are disposed. The coil thrust springs 16 are designed for the higher torque range and have a substantially cylindrical form both in their installed state and also when they are not installed. In contrast, the coil thrust springs 15 which produce the flat part of the spring characteristic, are substantially longer in proportion to their diameter and they are therefore, in their installed condition, arcuately housed in the pot-shaped part of the piston 8. For the reasons already mentioned at the outset, these coil thrust springs 15 are precurved when produced, as shown in FIG. 9, so that when the torsion vibration damper 2 is installed, they can easily be fitted into the curved path provided. In order to avoid the possibly sharply edged ends of the end portions of the coil thrust springs 15 creating an uncontrolled degree of friction against the piston 8, it is envisaged that the hub disc 46 should be equipped with holders 18 which maintain the spring ends at a slight radial distance from the inner wall of the piston 8 in the region of the axial wall zone 20. The guide element 22 is furthermore so constructed that its radially inner portion 32 rests in axially resilient manner on the cover plate 48 which is towards the turbine wheel 9 where it generates a frictional force as the result of relative movement. This axially acting spring force is transmitted by the cover plate 48 to the cover plate 47 (via the connecting rivets 72) and this passes the bracing force radially within the coil thrust springs 16 directly onto the piston 8.

Figure 1:
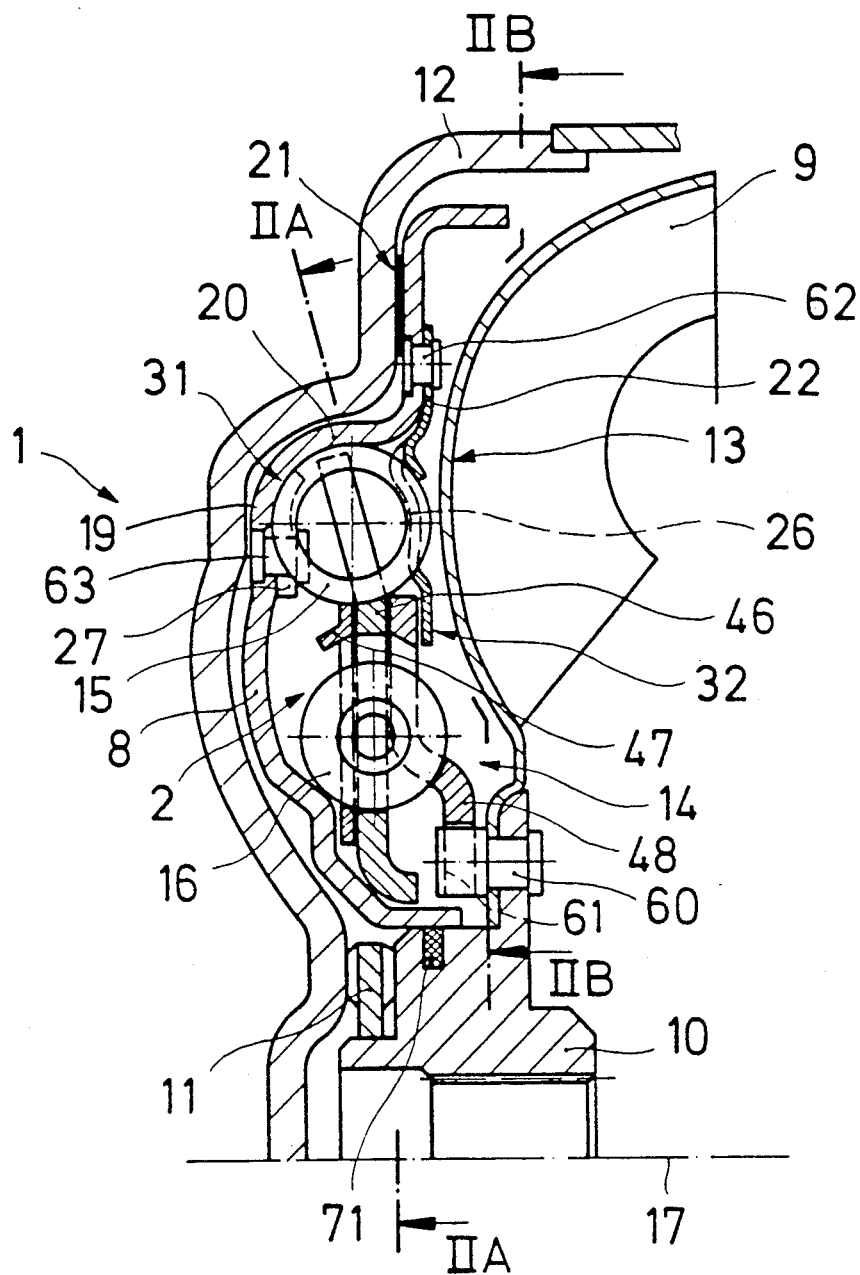
FIG. 1 is a sectional view of a part of a bridging coupling of a torque converter with, superposed in two rows, an arrangement of torsion springs viewed on the line I—I in FIG. 2b.
Figure 2:
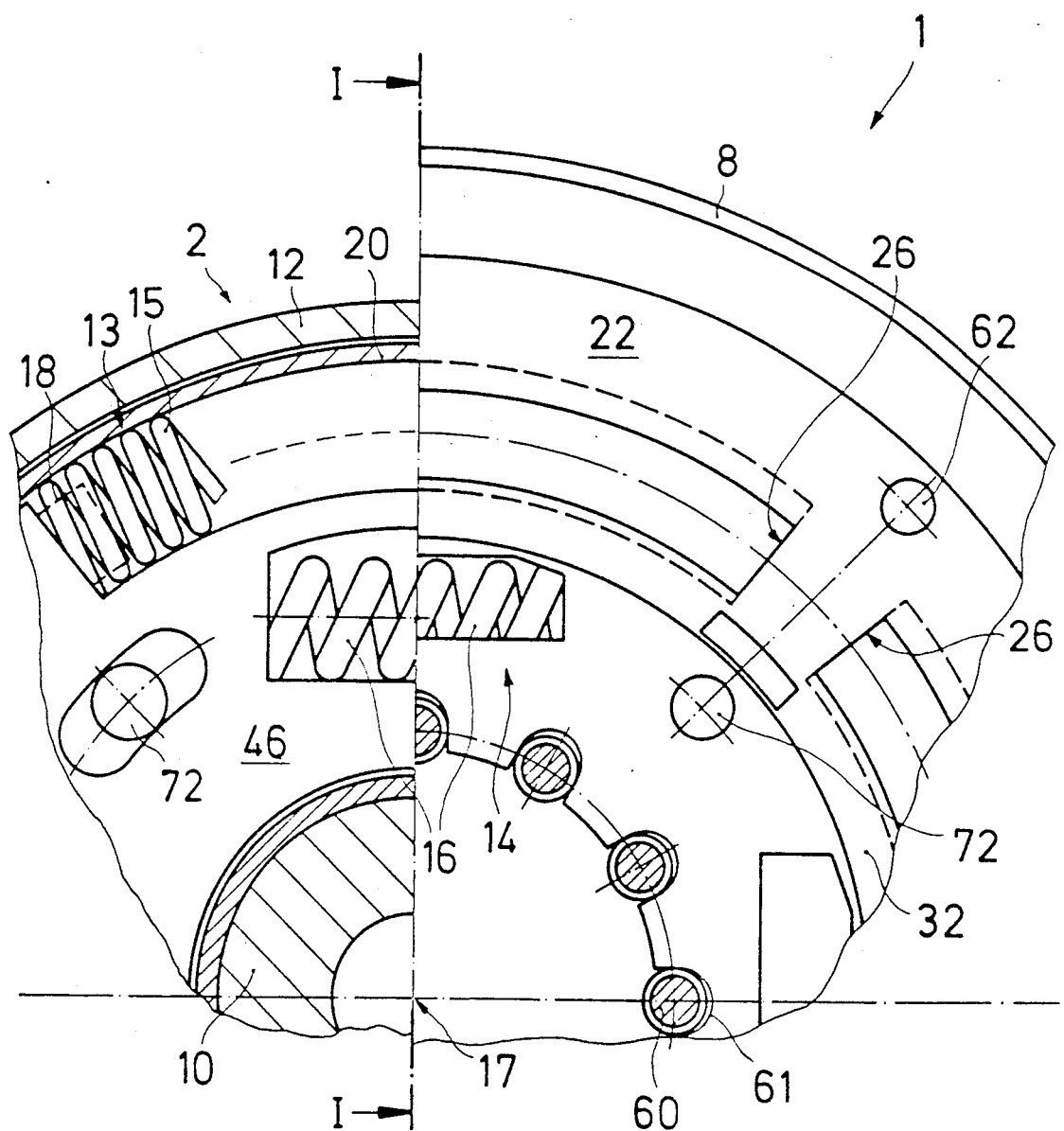
Figure 3:
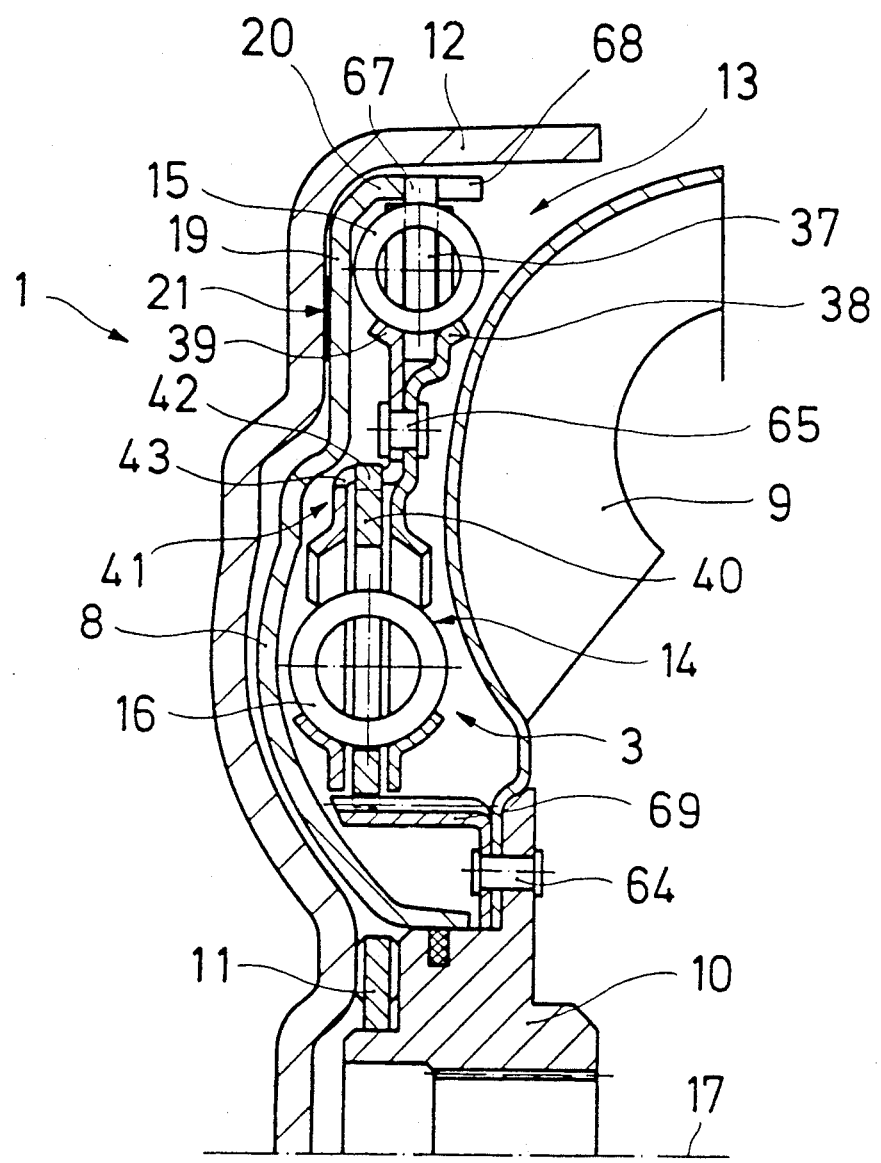
FIG. 3 shows an alternative embodiment to that in FIG. 1.

Alternative embodiments of bridging coupling are described hereinafter. In the description, identical components bear identical reference numerals. By way of explanation, reference is made to the relevant parts of the preceding description. In the case shown in FIG. 3, the torsion vibration damper 3 is likewise provided with two radially superposed torsion spring arrangements 13, 14 which are likewise linked in series. The coil thrust springs 15 of the first torsion spring arrangement 13 are intended for the flat part of the spring characteristic curve and already in their pre-installation condition, they are precurved to match the position in which they are fitted. In the present case, the axial wall zone 20 of the piston 8 only guides the coil thrust springs 15 in a radial direction. In the axial direction, these springs are guided by two cover plates 38 and 39 which are rigidly connected to each other by rivets 65 and they are guided in an axial direction by actuating elements 37. These actuating elements 37 have radially outwardly pointing projections 67 which are inserted into and fixed in axially extending slots 68 in the wall zone 20 of the piston 8.

The two cover plates 38 and 39 are extended radially inwardly, the cover plate 39 being axially offset in the direction of the piston 8, the they actuate the radially inner coil springs 16. Then, the torque is dissipated via a hub disc 40 between the two cover plates 38 and 39 which, by means of a tooth system, are rotationally rigidly but axially displaceably mounted on an angled ring 69 which is in turn connected by rivets 64 to the hub 10 of the turbine wheel 9. The hub disc 40 comprises radially outwardly extending projections 42 which engage apertures 43 in the cover plate 39, these apertures 43 being disposed in an axial recess 41. The projections 42 and the apertures 43 form a twisting abutment between the two cover plates 38 and 39 and the hub disc 40.

Figure 4:
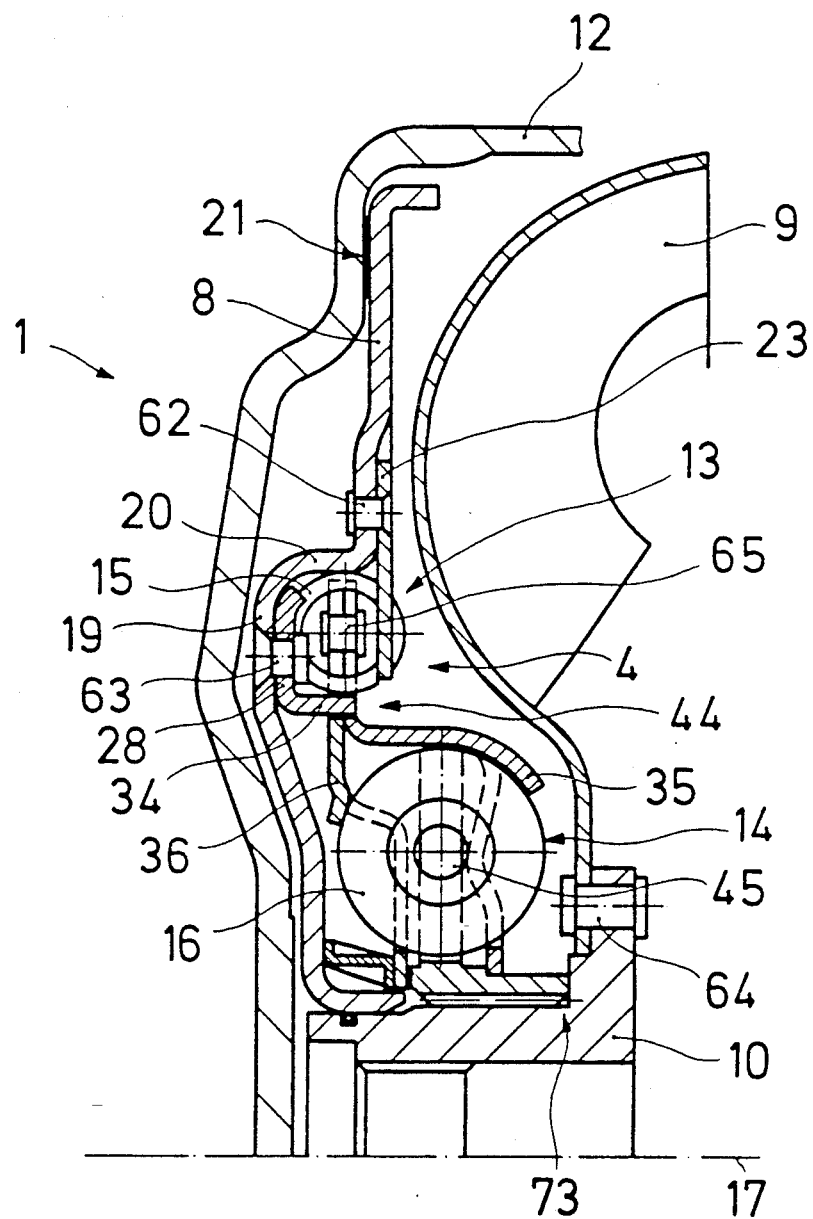
FIG. 4 shows a further alternative embodiment in relation to FIGS. 1 to 3.

FIG. 4 shows a further partial longitudinal section through a bridging coupling 1 with a torsion vibration damper 4. This likewise consists of two radially superposed torsion spring arrangements 13 and 14 with sets of coil thrust springs 15 and 16. In the present case, both torsion spring arrangements are offset radially inwardly and disposed on diameters which are smaller than the mean torque arm of the hydrodynamic force transmission system. The coil thrust springs 15 are guided in a radial direction and in one axial direction by the portions 19, 20 of the piston 8 and in the other axial direction by the arrangement of guide elements 23, both this guide element and also those shown in the other illustrations being possibly constructed in one or a number of parts. In addition to the guide element 23, actuating elements 28 are provided which are fixed to the piston 8 by rivets 63. Both these, together with mutually corresponding control edges, actuate the coil springs 15. In the axial space between guide element 23 and actuating elements 28, two cover plates 35 and 36 of the second torsion spring arrangement 14 are provided as a hub disc to transmit the torque. The cover plate 35 which is towards the turbine wheel 9 is of pot-shaped construction radially within the first torsion spring arrangement 13, extends in the direction of the turbine wheel 9 and so forms a guide for the coil thrust springs 16. The two cover plates 35 and 36 likewise actuate the coil thrust springs 16 and these transmit their torque to a hub 45 which by means of teeth 73 is rotationally rigidly fitted onto the hub 10. Radially within the coil thrust springs 15, each of the actuating elements 28 is provided with axially angle-over projections 34 which extend in the direction of the turbine wheel 9 and engage corresponding apertures 44 in the two cover plates 35 and 36 in order to achieve a limiting of the angle of rotation.

Figure 5:
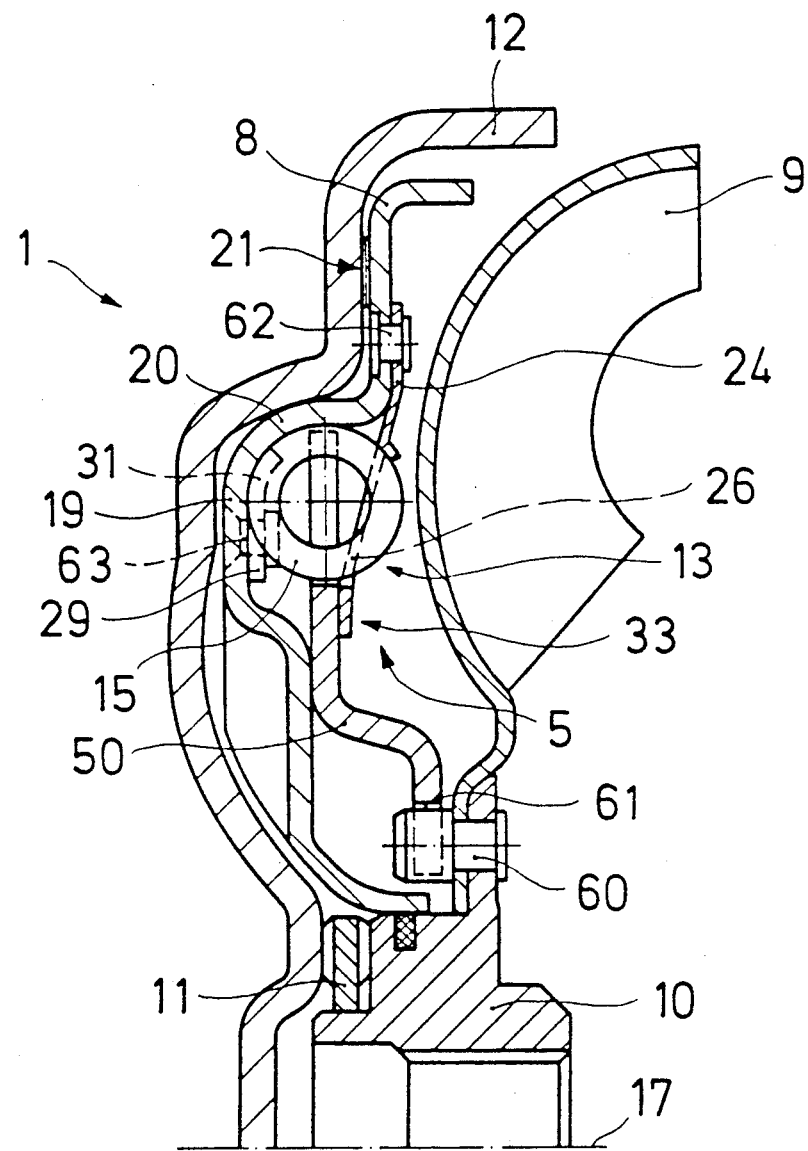
FIG. 5 shows a single row torsion spring arrangement in a bridging coupling.

FIG. 5 shows a further alternative embodiment of bridging coupling 2 with a torsion vibration damper 5 which is provided with only a first torsion spring arrangement 13. The arrangement 13 comprises precurved coil thrust springs 15 which are guided by the wall portions 19 and 20 of the piston 8 in a radial and in one axial direction while in the other axial direction they are guided by the guide element 24. The guide element 24 is, radially outside the springs 15, riveted to the piston 8 by rivets 62 and extends radially inwardly, having recesses for guidance of the coil springs 15 and for their actuation via control edges 26. Opposite the guide element 24 there is in turn, fixed by rivets 63 to the piston 8, an actuating element 29 which has control edges 31 corresponding to the control edges 26. The guide element 24 is provided radially within the coil springs 15 with an area 33 which bears on a hub disc 50 under an axial pre-tension which acts in the direction of the piston 8, the hub disc 50 transmitting the torque from the coil springs 15 to the hub 10 of the turbine wheel 9. The axial force generated by the guide element 24 is, via the hub disc 50, additionally braced on the piston 8. Thus, a friction arrangement is created which, upon relative rotation, i.e. when torque is applied, becomes effective between the guide element 24 and the piston 8 on the one hand and the hub disc 50 on the other. The hub disc transmits its torque to the hub 10 via extended clinch bolts 60 in the hub 10 and corresponding recesses 61 in the hub disc.

Figure 6:
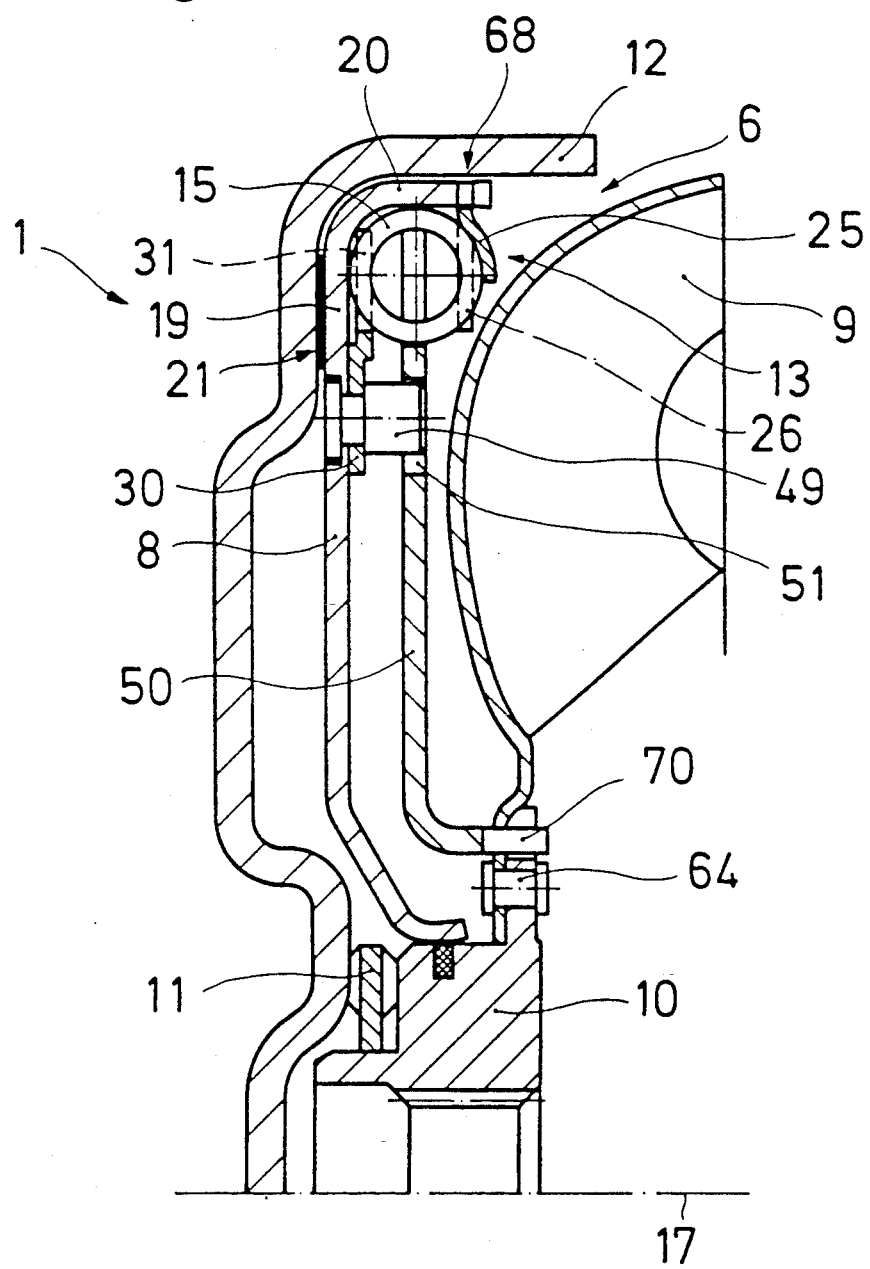
FIG. 6 shows an alternative to FIG. 5.

FIG. 6 shows a further partial longitudinal section through a bridging coupling 1 with a torsion vibration damper 6 which comprises a first torsion spring arrangement 13 which is radially and completely outwardly accommodated in the piston 8. Such an arrangement is axially space-saving and provides a ready opportunity for accommodating the torsion springs 15 on a large medium diameter. In this case, the piston 8 is disposed radially outside the friction surface 21 in respect of the housing 12 with the axially extending wall portion 20 which here creates both the necessary stability of shape for the piston 8 and also, at the same time, takes over radial guidance of the coil springs 15. Axial guidance of the coil springs 15 takes place on the one hand via the radial wall portion 19 of the piston 8 and on the other via guide elements 25 which have radially extending projections which engage axially extending slots 68 in the wall portion 20 in rotationally rigid manner, being axially fixed for example by being plugged. These guide elements 25 comprise control edges 26 for applying torque to the coil springs 15. At the piston end, the coil springs 15 are actuated via actuating elements 30 with control edges 31. The actuating elements 30 are, radially within the coil springs, connected by clinch bolts 49 to the piston 8, the clinch bolts 49 being extended in length in the direction of the turbine wheel 9 and having the effect of limiting the angle of rotation, together with elongated holes 51 in the hub disc 50. The hub disc 50 is disposed substantially centrally between the guide elements 25 and the actuating elements 30 and transmits the torque from the coil springs 15 to the hub 10. For this purpose, the radially inner area of the hub disc 50 is provided with axially angled-over projections 70 which engage corresponding apertures in a radial extension of the hub 10 in rotationally rigid but axially displaceable manner.

Figure 7:
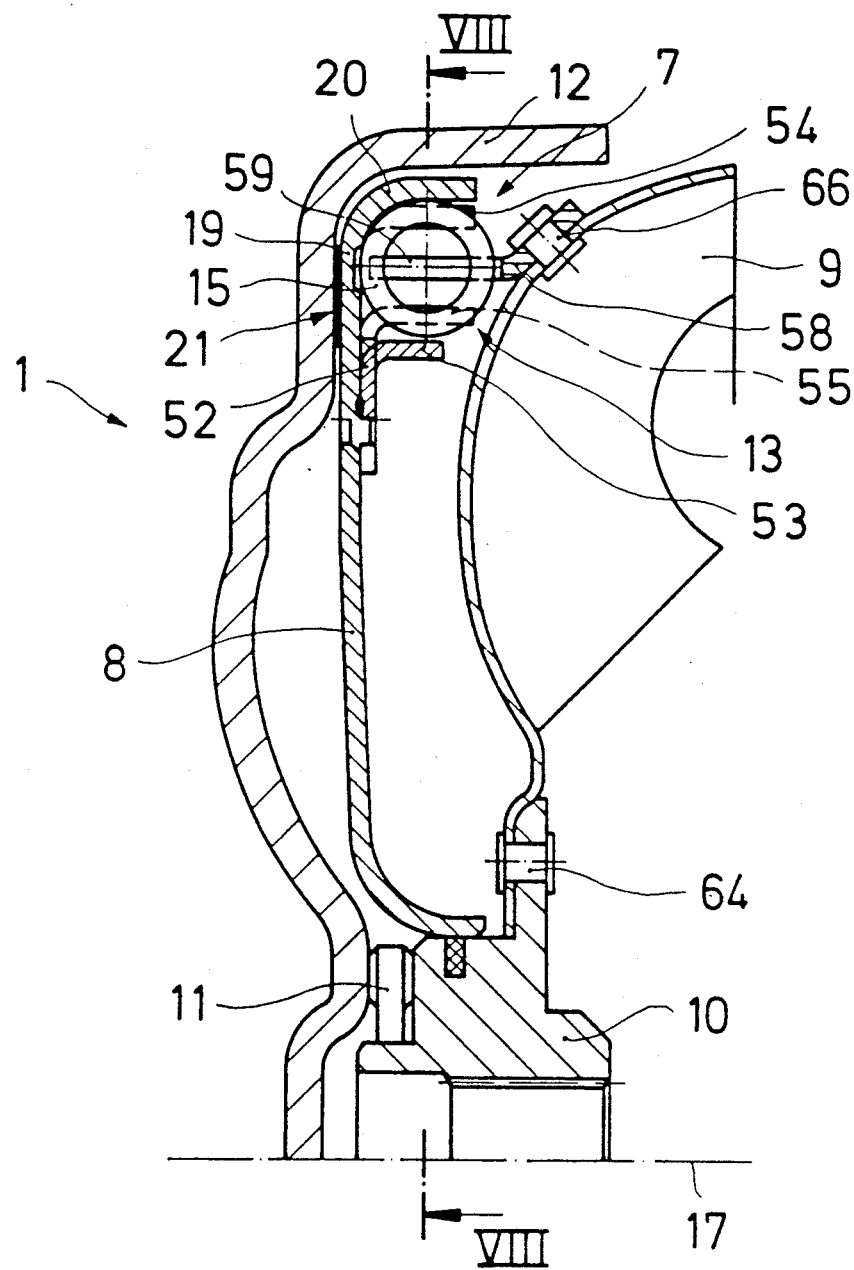
FIG. 7 shows a further alternative embodiment in which the torsion vibration damper is bonded directly on the turbine wheel of a torque converter.
Figure 8:
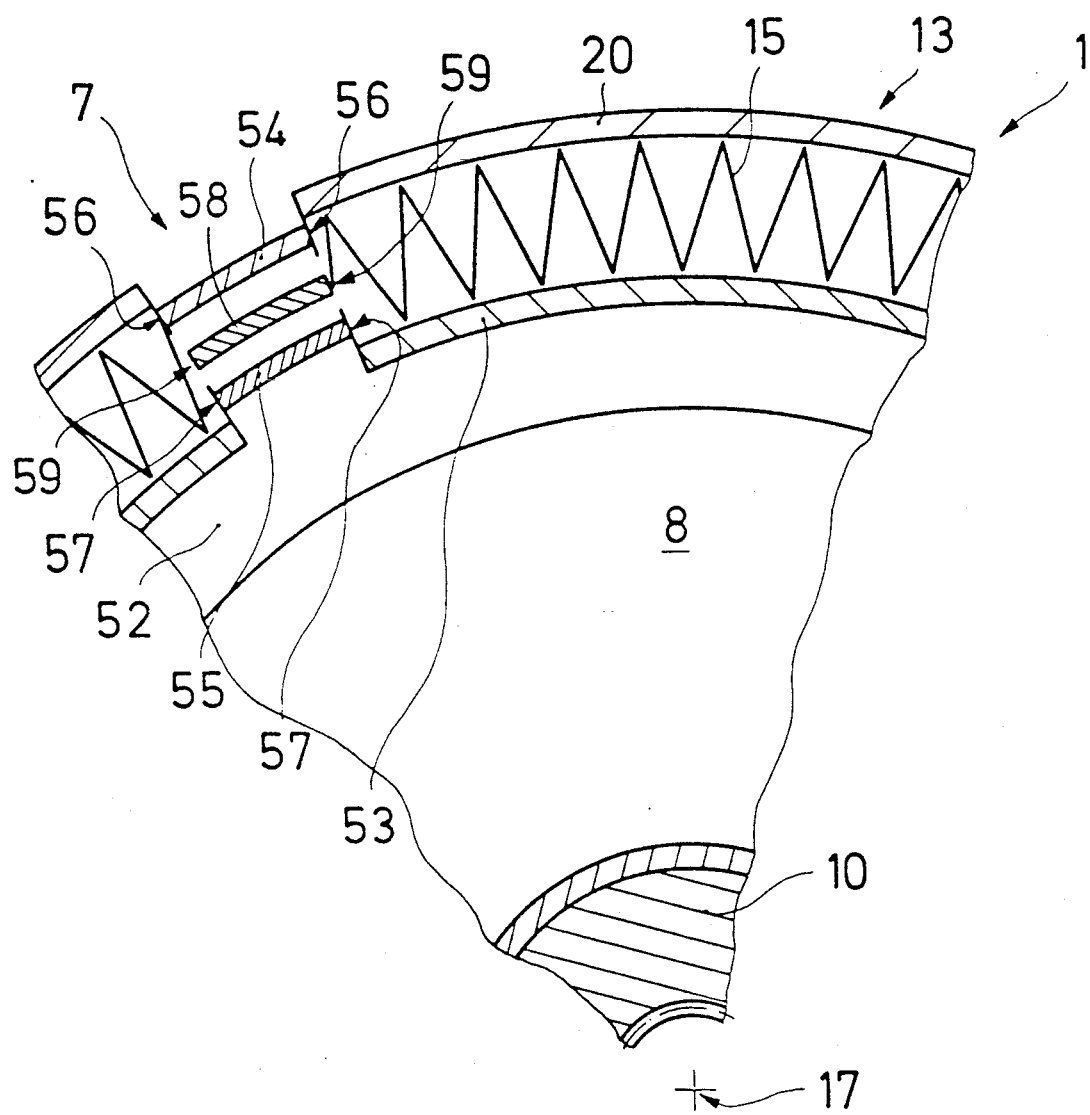
FIG. 8 is a sectional view taken on a line VIII—VIII in FIG. 7.
Figure 9:
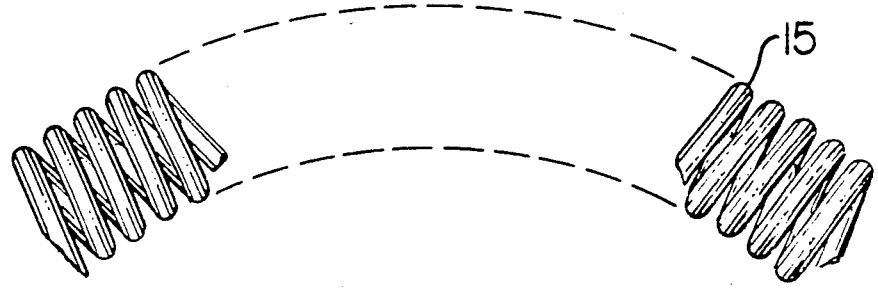
FIG. 9 shows a thrust of FIGS. 2a and 2b in a not installed condition.

The embodiment shown in FIGS. 7 and 8 differs from the previous embodiment in that in this case the output part of the torsion vibration damper 7 is connected directly to the shell of the turbine wheel 9. This means that a hub disc 58 of the torsion vibration damper 7 has substantially the shape of a cylindrical ring, peripheral control edges 59 for actuating the coil thrust springs 15 and that its portion which is extended from the piston 8 in the direction of the turbine wheel 9 is rigidly connected to the outer shell of the turbine wheel 9 through rivets 66. Guidance of the coil springs 15 in a radial direction is effected via the axial wall portions 20 of the piston 8 in the manner described, although for actuating the springs—as can be seen especially from FIG. 8—the periphery of the wall portion 20 is interrupted in that there are stamped out portions 54 which are offset somewhat radially inwardly and form the control edges 56. For guiding the coil springs 15 radially inwardly, a guide element 52 is provided which has a substantially pot-shaped form and is rigidly connected to the piston. It has, extending substantially parallel with the wall portion 20 of the piston 8, a wall portion 53 which guides the springs in a radial direction. For symmetrical actuation of the coil springs 15, the guide element 52 is likewise provided with stamped-out portions 55 which are offset by a corresponding amount radially outwardly, their peripheral control edges 57 actuating the coil springs 15. The torsion spring arrangement 13 described here likewise has precurved coil springs 15 which are very easily fitted, inter alia by reason of their precurved form.

The aforesaid examples of embodiment all comprise, at least in the first torsion spring arrangement, precurved coil springs which can be easily fitted, minimal undesired friction and can all be installed without any radial clamping. With a more pronounced preliminary curvature than that which corresponds to the fitted position, it is ensured that the end zones of the springs operate in a friction-free manner in the lower speed range. In the case of an embodiment with a lesser curvature than that which corresponds to the installed position, there is likewise, in addition to the advantage of easier installation, the fact that the middle portion of the spring only bears outwardly at the higher rotary speeds and when the application of torque means that the force component is increased. Additionally, for centrifugal force-dependent friction, the holders which maintain the spring ends at a distance from the radially outer rest position, can influence the friction. By these measures, apart from easy installation, it is possible to achieve a targeted attuning of the friction force which is indeed in principle dependent upon rotary speed but which cannot be influenced hardly at all in the state of the art. In addition, it is possible to minimise the wear and tear caused by friction. Naturally, the use in torsion vibration dampers of coil springs which are precurved when they are not installed relates not only to the use of bridging couplings in hydrodynamic gear mechanisms but it can also be applied to all torsion vibration dampers which operate with coil thrust springs and which possibly have an additional friction arrangement. Thus, it is readily possible for clutch discs of friction clutches to be equipped with these springs and also the torsion vibration damper systems of two-mass fly-wheels.

While specific embodiments of the invention have been shown and described in detail to illustrate the application of the inventive principles, it will be understood that the invention may be embodied otherwise without departing from such principle

What we claim is:

1. A torsion vibration damper for the drive line of a motor vehicle, comprising
   an input damper part (8) rotatable about an axis (17) of rotation
   an output damper part (9) rotatable about the axis of rotation (17) by a limited angle of relative rotation in respect of the input damper part (8) guide passages (20) on at least one of the damper parts (8) and arranged arcuately and concentrically about the axis of rotation (17)
   a first spring arragement (13) with, guided radially in the guide passages (20) and in the direction of the axis of rotation (17), and coupling the two damper parts (8,9) together in a rotationally resilient fashion, long-travel coil thrust springs (15), the length of which is a multiple of their diameter, the coil thrust springs (15) being precurved over their longitudinal extension when not installed.

2. A torsion vibration damper according to claim 1, wherein the coil thrust springs (15) have a radius of precurvature which is equal to or greater than the radius of curvature of the guide passage (20).

3. A torsion vibration damper according to claim 1, wherein the coil thrust springs (15) have a radius of precurvature which is equal to or less than the radius of curvature of the guide passage (20).

4. A torsion vibration damper according to claim 1, wherein the damper parts are coupled in rotationally resilient fashion to one another via a plurality of sets of coil thrust springs (15, 16) of differing ratings, and wherein the set of precurved coil thrust springs (15) has the lowest spring rating.

5. A torsion vibration damper according to claim 1, wherein the ends of the precurved coil thrust springs (15) are supported by holders (18) at a radial distance from guide faces of the guide passages (20) which are radially remote from the axis of rotation (17).

6. A torsion vibration damper according to claim 1, wherein there is provided in the drive line an hydrodynamic coupling of which the housing (12) which serves as a drive part, equiaxially encloses a turbine wheel (9) which serves as an output part and wherein there is adjacent the turbine wheel (9) and acting between the drive part (12) and the output part (9) a bridging coupling (1) which has a control piston (8) adapted for movement axially in relation to the turbine wheel (9) and wherein the control piston (8) has, enclosed by an approximately axially extending wall zone (20), a pot-shaped depression of which the axially extending wall part (20) outwardly guides the precurved coil thrust spring (15).

7. A torsion vibration damper according to claim 7, wherein adjacent the axially extending wall zone (20) of the control piston (8) there is, towards the axis of rotation (17), an area of curvature which merges into an approximately radially extending wall zone (19) and wherein the radius of curvature of the curved area, viewed in the plane of axial longitudinal section, is equal to or is smaller than the outer radius of the precurved coil thrust spring (15) and wherein the radially extending wall zone (19) axially guides the precurved coil thrust spring (15).

8. A torsion vibration damper according to claim 7, wherein the axially extending wall zone (20) of the control piston (8) extends axially beyond the cross-sectional centre of the coil thrust springs (15) and, on the side of the coil thrust springs (15) which is axially remote from the radial wall zone (19) merges into a connecting zone situated on the side of the coil thrust spring (15) which is remote from the axis of rotation (17) and on which there is supported a guide element (22, 23, 24, 25) which axially guides the coil thrust spring (15) and which projects in relation to the axis of rotation (17).

9. A torsion vibration damper according to claim 8, wherein axially between the guide element (22, 23, 24, 25) and the radial wall zone (19) of the piston (8) there is a hub disc (46; 35, 36; 50) coupled to the turbine wheel (9) and wherein the guide element (22, 23, 24, 25) and the hub disc (46; 35, 36; 50) has control edges (26, 31) for coupling with the end edges of the coil thrust springs (15).

10. A torsion vibration damper according to claim 9, wherein at least one control element (27, 28, 29, 30) is fixed, in particular is riveted, on the piston (8) and has, conforming to the control edges (26) of the guide element (22, 23, 24, 25) control edges (31) for coupling to the end faces of the coil thrust springs (15).

11. A torsion vibration damper according to claim 10, wherein each control element (28) comprises at least one axially angled-over projection (34) which engages an aperture (44) in the hub disc (35, 36) to limit the angle of relative rotation on the side of the coil thrust spring (15) adjacent the axis of rotation (17).

12. A torsion vibration damper according to claim 10, wherein the control elements (30) are supported on the piston (8) radially between the axis of rotation (17) and the coil thrust springs (15) by means of clinch bolts (49) which are extended axially towards the hub disc (50) and which, for limiting the relative angle of rotation, engage elongate holes (51) in the hub disc (50).

13. A torsion vibration damper according to claim 9, wherein the guide element (24) is extended via the precurved coil thrust spring (15) radially in respect of the axis of rotation (17) and bears frictionally on the hub disc (50).

14. A torsion vibration damper according to claim 9, wherein radially between the axis of rotation (17) and the diameter on which the precurved coil thrust springs (15) of the first spring arrangement (13) are disposed, second coil thrust springs (16) of a second spring arrangement (14) are disposed, and wherein the second spring arrangement (14) comprises, rotationally rigidly coupled to the turbine wheel (9) a hub disc (45) and side discs (35, 36) coupled in rotationally elastic fashion to the hub disc (45) via the two coil thrust springs (16) and disposed axially on either side of the hub disc (45), and wherein on the side of the second coil thrust spring (16) which is remote from the axis of rotation (17), the two side discs (35, 36) are connected to each other so that they bear on each other and form the hub disc of the first spring arrangement (13) and wherein the side disc (35) which is axially adjacent the turbine wheel (9) is potshaped and radially outwardly encloses the second coil thrust springs (16) and the hub disc (45).

15. A torsion vibration damper according to claim 9, wherein radially between the axis of rotation (17) and the diameter on which are disposed the precurved coil thrust springs (15) of the first spring arrangement (13), the second coil thrust springs (16) are disposed on a second spring arrangement (14), and wherein the second spring arrangement (14) comprises a hub disc (46) which at the same time forms the hub disc of the first spring arrangement (13) and which furthermore comprises, coupled in rotationally resilient fashion to the hub disc (46) via the second coil thrust springs (16), side discs (47, 48) which are connected in rotationally rigid fashion to each other and to the turbine wheel (9).

16. A torsion vibration damper according to claim 15, wherein the guide element (22) is extended beyond the coil thrust springs (15) of the first spring arrangement (13) radially of the axis of rotation (17) and bears resiliently on the side disc (48) which is axially adjacent the turbine wheel (9) and wherein the two side discs (47, 48) are maintained at a distance from each other and wherein the side disc (47) which is adjacent the piston (8) bears on the piston (8) on the side of the second coil thrust springs (16) which is adjacent the axis of rotation (17).

17. A torsion vibration damper according to claim 6, wherein the axially extending wall zone (20) of the piston (8) carries radially inwardly projecting control elements (37) of which the edges which face a circumferential direction co-operate with end faces of the precurved coil thrust springs (15) of the first spring arrangement (13) and wherein there are axially on both sides of the control elements (37) side discs (38, 39) which accommodate the coil thrust springs (15) in windows via which the coil thrust springs (15) are rotationally resiliently coupled to the control elements (37) and by which at least the side disc (38) which is axially remote from the piston (8) axially secures the coil thrust springs (15).

18. A torsion vibration damper according to claim 17, wherein radially between the axis of rotation (17) and the diameter on which the coil thrust springs (15) of the first spring arrangement (13) are disposed, there are second coil thrust springs (16) of a second spring arrangement (14), and in that the two side discs (38, 39) are guided radially inwardly beyond the coil thrust springs (15) of the first spring arrangement (13) and at the same time form side discs of the second spring arrangement (14) and wherein the second spring arrangement (14) comprises, disposed between the side discs (38, 39) and rotationally rigidly connected to the turbine wheel (9) a hub disc (40) which, via the second coil thrust springs (16), is rotationally elastically coupled to the side discs (38, 39).

19. A torsion vibration damper according to claim 18, wherein the side disc (39) which is axially adjacent the piston (8) has radially between the coil thrust springs (15) of the first spring arrangement (13) a pot-shaped depression which encloses the coil thrust springs (16) of the second spring arrangement (14) being riveted to the other side disc (38) radially outside the depression and wherein in the peripheral portion of the depression there are apertures (43) engaged by projections (42) which project radially from the hub disc (40) in order to limit the angle of relative rotation.

20. A torsion vibration damper according to claim 6, wherein the axially extending wall zone (20) of the piston (8) extends axially beyond the cross-sectional centre of the precurved coil thrust springs (15) and wherein there is on the side of the coil thrust springs (15) which is towards the axis of rotation (17) a pot-shaped guide element (55) supported on the piston (8) and having an axially extending wall zone (53) for radially guiding the coil thrust springs (15) and wherein the axially extending wall zones (20; 53) have, facing one another, freely stamped wall zones (54, 55) which form axially extending control edges for coupling to the coil thrust springs (50) and wherein there is supported on the turbine wheel (9) an at least approximately cylindrical ring (58) which projects between the two axially extending wall zones (54, 55) and accommodates the coil thrust springs (15) in recesses.

* * * * *